United States Patent
Li et al.

(10) Patent No.: US 8,131,065 B2
(45) Date of Patent: Mar. 6, 2012

(54) METHOD AND APPARATUS FOR OBTAINING AND PROCESSING IMAGE FEATURES

(75) Inventors: Jianguo Li, Beijing (CN); Tao Wang, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1083 days.

(21) Appl. No.: 11/961,659

(22) Filed: Dec. 20, 2007

(65) Prior Publication Data

US 2009/0285473 A1    Nov. 19, 2009

(51) Int. Cl.
*G06K 9/62* (2006.01)

(52) U.S. Cl. ........ 382/159; 382/155; 382/157; 382/181; 382/209; 382/224; 382/225; 382/226; 382/227; 706/14; 706/15; 706/16; 706/20; 706/30

(58) Field of Classification Search .................. 382/100, 382/115, 118, 155–160, 181, 192–194, 209, 382/224–227; 706/14–16, 20, 25, 30
See application file for complete search history.

(56) References Cited

U.S. PATENT DOCUMENTS

| | | | |
|---|---|---|---|
| 7,174,044 B2 | 2/2007 | Ding et al. | |
| 7,379,568 B2 * | 5/2008 | Movellan et al. | 382/118 |
| 7,536,044 B2 * | 5/2009 | Zhou et al. | 382/128 |
| 7,657,085 B2 * | 2/2010 | Sabe et al. | 382/159 |
| 7,668,346 B2 * | 2/2010 | Xiao et al. | 382/118 |
| 7,773,781 B2 | 8/2010 | Kim | |
| 7,916,933 B2 | 3/2011 | Schwartz et al. | |
| 2002/0102024 A1 * | 8/2002 | Jones et al. | 382/225 |
| 2009/0018981 A1 * | 1/2009 | Zhang et al. | 706/12 |

OTHER PUBLICATIONS

Paul Viola and Michael J. Jones, "Robust Real-Time Face Detection", International Journal of Computer Vision, vol. 57, No. 2, 2004, pp. 137-154.*
Non-Final Office Action for U.S. Appl. No. 11/961,649, Mailed May 23, 2011, 34 pages.
Wang, Haijing , et al., "Proposal of Novel Histogram Features for Face Detection", Third International Conference on Advances in Pattern Recognition, ICAPR, Lecture Notes in Computer Science, vol. 3687, Aug. 2005, pp. 334-343.

* cited by examiner

*Primary Examiner* — Matthew Bella
*Assistant Examiner* — Eric Rush
(74) *Attorney, Agent, or Firm* — Blakely, Sokoloff, Taylor & Zafman LLP

(57) ABSTRACT

Machine-readable media, methods, apparatus and system for obtaining and processing image features are described. In some embodiments, groups of training features derived from regions of training images may be trained to obtain a plurality of classifiers, each classifier corresponding to each group of training features. The plurality of classifiers may be used to classify groups of validation features derived from regions of validation images to obtain a plurality of weights, wherein each weight corresponds to each region of the validation images and indicates how important the each region of the validation images is. Then, a weight may be discarded from the plurality of weights based upon a certain criterion.

10 Claims, 6 Drawing Sheets

METHOD AND APPARATUS FOR OBTAINING AND PROCESSING IMAGE FEATURES

CROSS-REFERENCE TO RELATED APPLICATION

The present application claims the benefit of U.S. patent application Ser. No. 11/961,649, filed on Dec. 20, 2007, entitled "Method And Apparatus For Obtaining And Processing Image Features," the entire content of which is incorporated by reference herein.

BACKGROUND

Image recognition (e.g., face recognition) has been widely used in various applications and fields such as security applications and research fields. Image representation becomes a key for a successful recognition. Many researches have been focused on this. Among them, Gabor filters based representation has achieved significant success in image recognition. As a multi-scale and multi-orientation representation, raw Gabor features are of high dimensionality. Several technologies are proposed to solve this problem, such as Elastic bunch graph matching, local binary pattern, and local Gabor binary pattern histogram sequence.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE PREFERRED EMBODIMENTS

The following description describes techniques for obtaining and processing image features. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.) and others.

Figure 1:
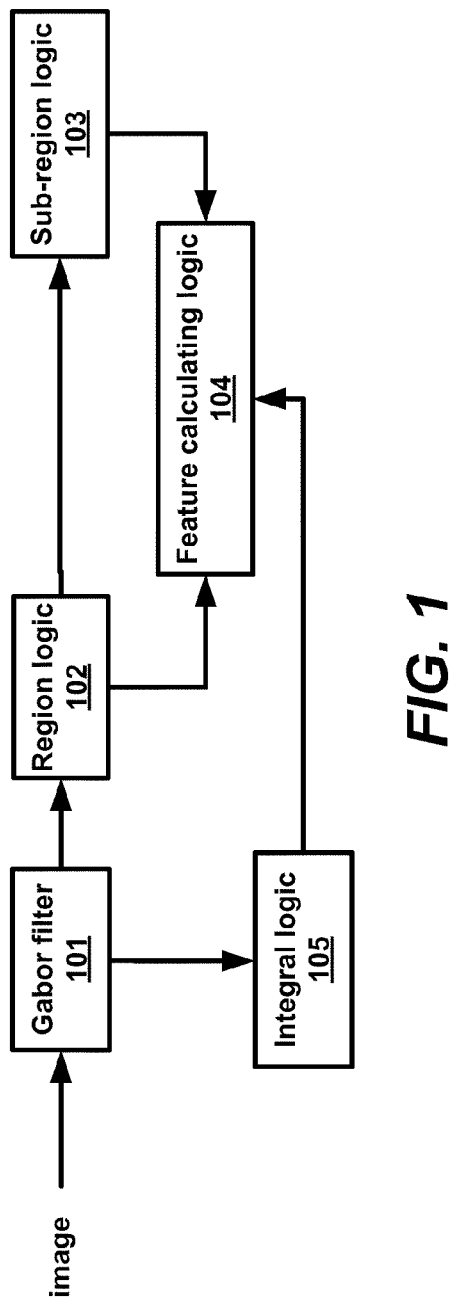
FIG. 1 illustrates an embodiment of an apparatus for obtaining refined Gabor features.

FIG. 1 shows an embodiment of an apparatus of obtaining refined Gabor features. As shown, the apparatus may comprise a Gabor filter 101, a region logic 102, a sub-region logic 103, a feature calculating logic 104 and an integral logic 105.

Gabor filter 101 may receive an image (e.g., a face image) and produce a Gabor representation of the image. In an embodiment, a 2D Gabor filter may be defined as follows:

$$\Psi(z, \sigma_s, \theta_o) = \frac{1}{2\pi\sigma_s^2} \exp\left\{-\frac{|z|^2}{2\sigma_s^2}\right\} [\exp\{jx'\kappa/\sigma_s\} - \exp\{-\kappa^2/2\}] \quad (1)$$

$$z = (x', y'), \begin{cases} x' = x\cos\theta_o + y\sin\theta_o \\ y' = -x\sin\theta_o + y\cos\theta_o \end{cases}$$

where x, y may represent a pixel position in a spatial domain, κ may represent a parameter for a bandwidth of Gabor filter 101, $\theta_o$ may represent an angle of Gabor filter 101 on the o-th orientation, and $\sigma_s$ are the Gaussian deviation on the s-th scale, which is proportion to a wavelength of Gabor filter 101.

The Gabor representation of the image may be derived by convolving the image with the above definition of Gabor filter 101 as follows:

$$G_{s,o}(x,y) = I(x,y) \otimes \Psi(x,y,\sigma_s,\theta_o) \quad (2)$$

where $G_{s,o}(x,y)$ may represent the Gabor representation of the image derived from Gabor filter 101 on the s-th scale and the o-th orientation, I(x,y) may represent the image.

Although the 2D Gabor transform is described above, it should be appreciated that other Gabor transforms can also be used, such as Log-Gabor transform.

Figure 2A:
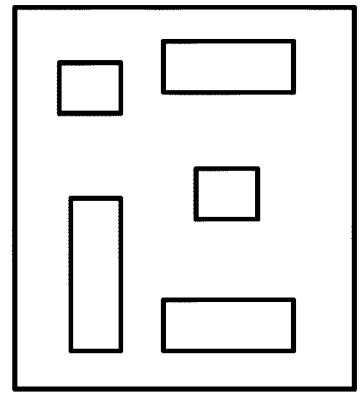
FIG. 2a illustrates an embodiment of a wave-front method for region selection.
Figure 2B:
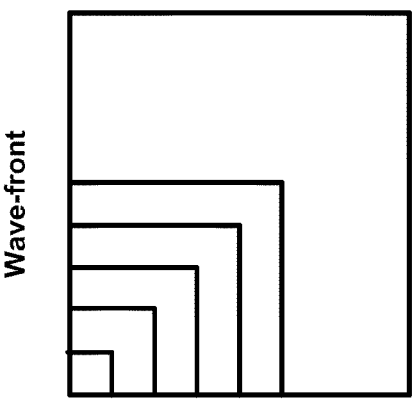
FIG. 2b illustrates an embodiment of a local-region method for the region selection.

Region logic 102 may select a region from the Gabor representation obtained by Gabor filter 101. The selected region may comprise some of Gabor pixels of the Gabor representation. Various methods may be applied for the region selection, for example, a wave-front method (referring to FIG. 2a) and a local-region method (referring to FIG. 2b).

Figure 3:
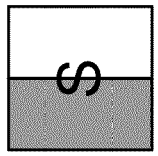
FIG. 3 illustrates a sub-region selection with reference to a Haar-pattern and an extended Haar pattern.
Figure 3:
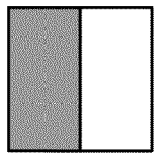
Figure 3:
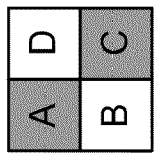
Figure 3:
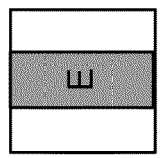
Figure 3:
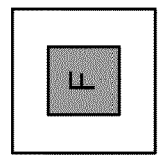
Figure 3:
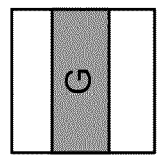

Sub-region logic 103 may select a sub-region from the region selected by region logic 103. The sub-region may comprise more than one Gabor pixels of the region. In an embodiment, the sub-region may be selected with reference to a Haar-pattern and/or an extended Haar-pattern. FIG. 3 illustrates an embodiment of the Haar-pattern and the extended Haar-pattern. In FIG. 3, the outer rectangular may represent the region, and the shadowed region may represent the sub-region.

The first four patterns are the basic Haar-patterns, and the rest are the extended Haar-patterns. It should be appreciated that although six sub-region patterns are illustrated, the sub-region may be selected in other patterns.

Feature calculating logic 104 may calculate refined Gabor features based upon a magnitude calculation related to the region and the sub-regions. In an embodiment, feature calculating logic 104 may calculate magnitude sums for the Gabor pixels in the sub-regions and a magnitude sum for the Gabor pixels in the region, and then obtain the refined Gabor features by dividing the magnitude sums related to the sub-regions by the magnitude sum related to the region. The term "refined Gabor feature" is used for comparison with the term "raw Gabor feature" that is defined as a magnitude of a Gabor pixel of the Gabor representation.

Taking the six sub-region patterns of FIG. 3 as an example, feature calculating logic 104 may calculate the refined Gabor features with the following equations:

$$f_1(S)=(|A|+|B|)/|S|, f_4(S)=|E|/|S|,$$

$$f_2(S)=(|A|+|D|)/|S|, f_5(S)=|F|/|S|,$$

$$f_3(S)=(|A|+|C|)/|S|, f_6(S)=|G|/|S| \quad (3)$$

where f(S) may represent a refined Gabor feature of a region S and the value of f(S) is in a range of [0,1], $f_1(S)$ may correspond to the first pattern of FIG. 3, wherein |A| may represent a magnitude sum of the Gabor pixels in rectangular A, |B| may represent a magnitude sum of the Gabor pixels in rectangular B, and |A|+|B| may represent a magnitude sum of the Gabor pixels in the sub-region, |S| may represent a magnitude sum of the Gabor pixels in the region, and so for the rest of refined Gabor features $f_2(S) \ldots f_6(S)$.

In another embodiment, feature calculating logic 104 may obtain the refined Gabor features by calculating magnitude differences as follows:

$$f_1(S)=|A|+|B|-|C|-|D|, f_4(S)=|S|-|E|,$$

$$f_2(S)=|A|+|D|-|B|-|C|, f_5(S)=|S|-|F|,$$

$$f_3(S)=|A|+|C|-|B|-|D|, f_6(S)=|S|-|G| \quad (4)$$

Figure 4:
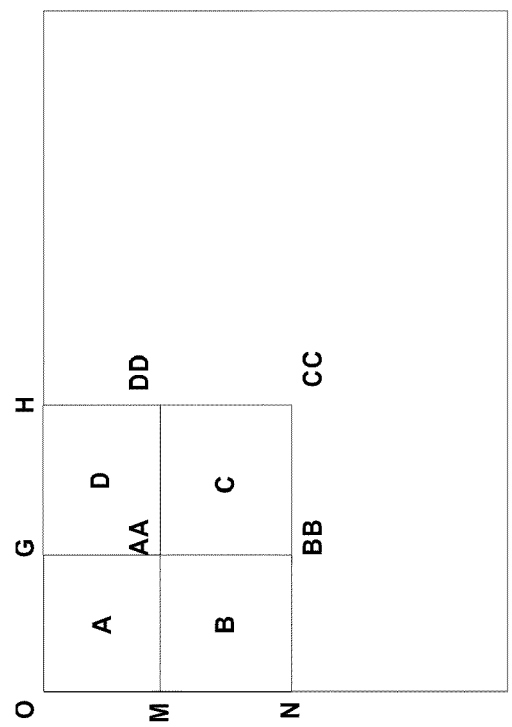
FIG. 4 illustrates an embodiment of an integral image.

Integral logic 105 may produce an integral image from the Gabor representation derived from Gabor filter 101. FIG. 4 illustrates an embodiment of the integral image in a coordinate system. Each integral pixel of the integral image, such as integral pixels AA, BB, CC or DD, may correspond to a Gabor pixel (not shown) of the Gabor representation. Value of the integral pixel may represent a sum of magnitudes for all of the Gabor pixels within a rectangular defined by an origin of the coordinate system and the Gabor pixel that corresponds to the integral pixel: $IG(x,y)=\Sigma_{x,y}|G(x',y')|$ $x' \leq x, y' \leq y$, wherein IG(x,y) may represent value of an integral pixel that corresponds to a Gabor pixel G(x,y), |G(x',y')| may represent a magnitude of a Gabor pixel G(x',y') within a rectangular defined by the origin and the Gabor pixel G(x,y).

For example, the value of integral pixel AA may represent the sum of magnitudes for all of the Gabor pixels within the rectangular defined by the origin (O) and the Gabor pixel (AA).

It can be seen that the Integral image may make a feature calculation with feature calculating logic 104 easier. This is because a magnitude sum (e.g., |A|, |B|, |C|, |D|, |E|, |F|, and |S|) used for the feature calculation can be easily obtained from the integral image with a limited number of calculations. For example, assuming that sub-region A is equivalent to the rectangular defined by the origin and integral pixel AA, sub-region A+B is equivalent to the rectangular defined by the origin and integral pixel BB, sub-region A+D is equivalent to the rectangular defined by the origin and integral pixel DD, and sub-region A+B+C+D is equivalent to the rectangular defined by the origin and integral pixel CC. Therefore, |A| may be obtained directly from the value of integral pixel AA (i.e., IG(AA)), |B| may be obtained by subtracting the value of integral pixel AA from the value of integral pixel BB (i.e., IG(BB)), |D| may be obtained with the equation: |D|=IG(DD)−IG(AA), and |C| may be obtained with the equation |C|=IG(CC)−IG(BB)−IG(DD)+IG(AA).

Figure 5:
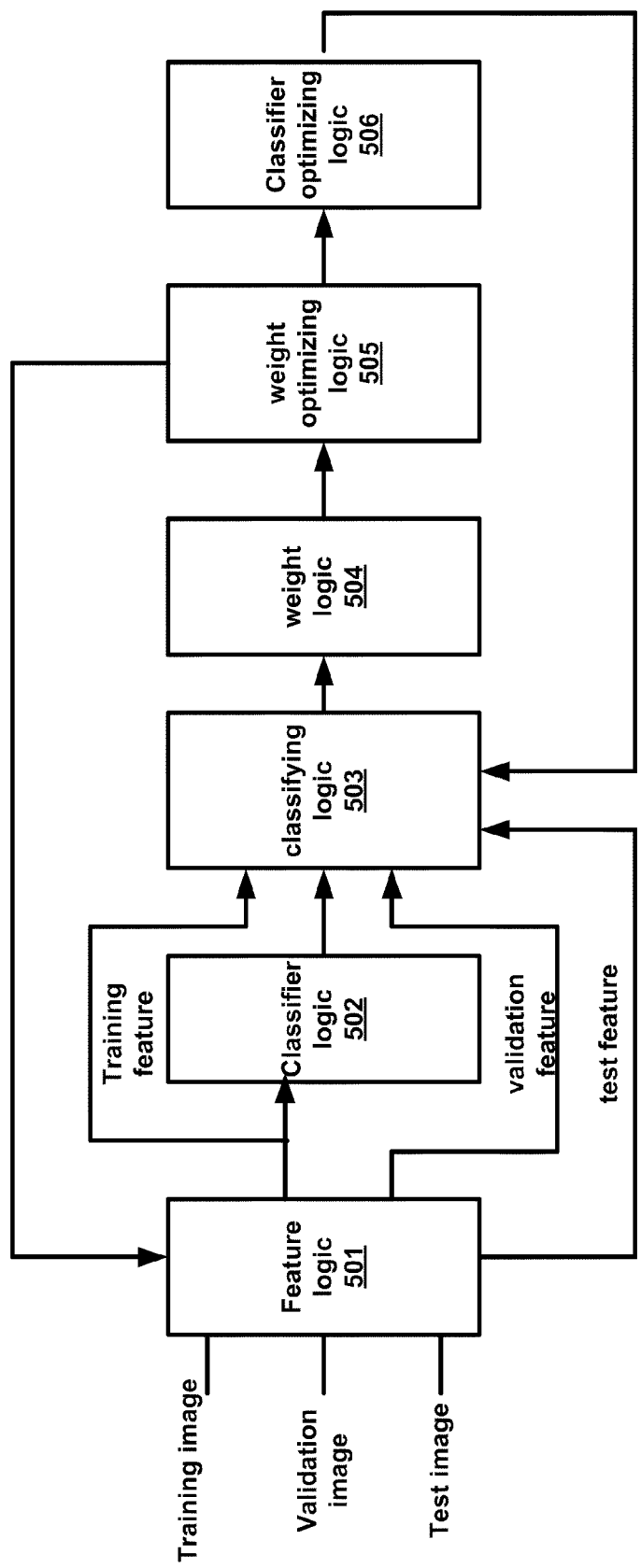
FIG. 5 illustrates an apparatus for obtaining and processing image features.

FIG. 5 illustrates an embodiment of an apparatus for obtaining and processing image features. The apparatus as shown may comprise a feature logic 501, a classifier logic 502, a classifying logic 503, a weight logic 504, a weight optimizing logic 505, and a classifier optimizing logic 506.

Feature logic 501 may receive a set of training images and select regions from each training image. Although various methods may be used to select the regions, feature logic 501 may use a uniform method to select regions from each training image, for example, either with the wave-front method or with the local-region method. Then, feature logic 501 may obtain training features from each region of each training image, and group the training features for all of the training images on region basis. In other words, the training features derived from the same region of different training images may be grouped together and the number of the training feature groups may be the same as the number of the regions.

For example, if the local-region method is adopted to select regions from multiple training face images and N local regions are selected from each training face image that may include left eye region, right eye region, mouth region, etc, then training features derived from the left eye region for all of the training face images may be grouped together. In this way, each group of training features may correspond to each region of the training images.

Further, each group of training features may comprise multiple sub-groups of training features, in which one sub-group of training features may be derived from one region of one training image. Therefore, the number of the sub-groups included in each group may be the same as the number of the training images.

Various methods may be applied to obtain the training features, such as the refined Gabor feature method, and the local Gabor binary histogram sequence method. If the refined Gabor feature method is applied, the training features may be the refined Gabor features. If the local Gabor binary histogram sequence method is applied, the training features may be the local Gabor binary histogram sequences. Here, the training image may be a raw image, or an intermediate image (i.e., Gabor representation) derived from a Gabor filter.

Similarly, feature logic 501 may further obtain groups of validation features from a set of validation images. Each group of validation features may correspond to each region of the validation images. Further, each group of validation features may comprise multiple sub-groups of validation features, in which one sub-group of validation features may be derived from one region of one validation image.

The same method that is used to select regions from the training images may be used to select regions from the validation images. Therefore, corresponding relationships may be established between the regions of the training images and the regions of the validation images, namely, each region of the training images may correspond to each region of the validation images. For example, the left eye region of the validation face images may correspond to the left eye region of the training face images. Thus, a group of validation features derived from a region of the validation images may correspond to a group of training features derived from the corresponding region of the training images. Similar as the training features, various methods may be applied to obtain the validation features, and will not be reiterated here for simplicity.

Classifier logic 502 may train the groups of training features and obtain a plurality of classifiers. Each classifier may correspond to each group of training features and thus correspond to each region of the training images. Various methods may be used to train the training features for the classifiers, such as a dual-space linear discriminant analysis method, principal component analysis method, and Boosting method.

Classifying logic 503 may utilize the plurality of classifiers to classify the groups of validation features. A classifier may classify a group of validation features that it corresponds to and a similarity factor may be obtained for the group of validation features. In an embodiment, the similarity factor may comprise multiple distances and a label for each sub-group of the group of validation features. The multiple distances may be obtained by comparing a sub-group of validation features derived from a region of a validation image with different sub-groups of training features derived from the same region of different training images. Thus, a distance may indicate how close the sub-group of validation features is to a sub-group of training features derived from a training image.

Among the distances, a minimum distance may be determined, based upon which the label that may indicate whether the sub-group of validation features positively or negatively match with the sub-group of training features derived from the training image corresponding to the minimum distance may be obtained. Since the groups of validation features are classified, a plurality of similarity factors may be obtained, each similarity factor corresponding to each group of validation features and thus corresponding to each region of the validation images.

Weight logic 504 may train the plurality of similarity factors and obtain a plurality of weights. Each weight may correspond to each group of validation features, and thus correspond to each region of the validation images. In an embodiment, a probabilistic discriminant learning scheme may be adopted for the weight calculation. Based upon the plurality of similarity factors, a similarity combination for each validation image may be established as follows:

$$z=[z_1,\ldots,z_n]^T, t \quad (5)$$

wherein, each of $z_1, \ldots, z_n$ may represent the minimum distance corresponding to each region of the validation image, and t may represent a new label indicating whether the validation image positively or negatively matches with the training image, in which the new label may be determined based upon the above-stated labels.

Then, a discriminant function may be defined as follows:

$$\eta(z) = \log\frac{P(t=1|z)}{P(t=0|z)} = \log\frac{P(t=1|z)}{1-P(t=1|z)}, z=[z_1,\ldots,z_n]^T \quad (6)$$

wherein $\eta(z)$ may represent the discriminant function, $p(t=1|z)$ may represent a probability that the validation image positively match with the training image, $p(t=0|z)$ may represent a probability that the validation image negatively match with the training image.

Since $\eta(z)$ is characterized as a linear function, then $$\eta(z)=\beta^T z, z=[z_1,\ldots,z_n]^T \quad (7)$$

wherein $\beta$ may represent a plurality of weights, each weight corresponding to each region of the validation image.

Please note that equations (5)-(7) are established for one validation image. In order to calculate the plurality of weights, multiple validation images may be classified and a likelihood function may be established as follows:

$$L(z) = \sum_{t(z_i)=1} \eta(z_i) - \sum_{t(z_j)=0} \eta(z_j) \quad (8)$$

wherein, L(z) may represent the likelihood function, $$\sum_{t(z_i)=1} \eta(z_i)$$

may represent a sum of discriminant functions for all of the validation images which positively match with the training images, and $$\sum_{t(z_j)=0} \eta(z_j)$$

may represent a sum of discriminant functions for all of the validation images which negatively match with the training images, integers i and j may respectively represent indexes of the validation images that positively and negatively match with the training images.

The weights may be obtained by maximizing the likelihood function as follows:

$$\max\left(L(z) = \sum_{t(z_i)=1} \eta(z_i) - \sum_{t(z_j)0} \eta(z)\eta(z_j)\right) \quad (9)$$

Note that $L(z)=tL(z)+(1-t)L(z)$, it is easy to show that the following equation (10) is equivalent to the above maximal likelihood function:

$$\max\prod_i P(t=1|z)^t P(t=0|z)^{1-t} \quad (10)$$

$$\Leftrightarrow \max\prod_i P(t;z),$$

wherein $P(t;z) = P(t=1|z)^t P(t=0|z)^{1-t}$.

Equation 10 is in fact a logistical regression model, which can be solved by the iterative re-weighting least square (IRLS) algorithm. Therefore, the plurality of weights can be obtained, in which each weight may correspond to each region of the validation images. It should be appreciated that other algorithms may be used to learn the weights, such as Boosting method.

Weight optimizing logic 505 may optimize the plurality of weights learned by weight logic 504 based upon a certain criteria. In an embodiment, negative weights may be discarded, and therefore, the number of effective weights (i.e., positive weights) may be reduced.

Classifier optimizing logic 506 may utilize the optimized weights to optimize the plurality of classifiers obtained by the classifier logic 502. In an embodiment, classifier optimizing logic 506 may optimize the classifiers with the following equation:

$$h(x) = \sum_{m=1}^{M} \beta_m^* h_m(x) \quad (11)$$

wherein, h(x) may represent a combination of optimized classifier(s), integer M may represent the number of optimized weights (i.e., effective weights), $\beta^*_m$ may represent the $m^{th}$ optimized weight, and $h_m(x)$ may represent the $m^{th}$ classifier before the optimization.

The following may explain how to use the optimized classifier(s) and optimized weight(s) to optimize the process of recognizing a test image.

After a test image is received, feature logic 501 may obtain test features from region(s) of the test image with reference to the optimized weight(s). Particularly, feature logic 501 may select region(s) from the test image with reference to the region(s) of the validation image that corresponds to the optimized weight(s). With this scheme, the number of the selected region(s) may be reduced to the same as the number of the optimized weight(s), which may thus reduce the complexity for feature calculation and image recognition later.

As stated above, various methods may be used to obtain the test features, such as the refined Gabor feature method, and local Gabor binary histogram sequence method. Feature logic 501 may further group the test feature on regional wise, and thus, each group of test features may correspond to each selected region of the test image.

Then, classifying logic 503 may utilize the optimized classifier(s) to classify the test features. With similar method as stated with reference to the validation image, the optimized classifier(s) may classify the groups of the test features and obtain a label indicating whether the test image positively or negatively match with the training image.

It should be appreciated that the apparatus of FIG. 5 can be used to train and learn a single training image and/or a single validation image.

Figure 6:
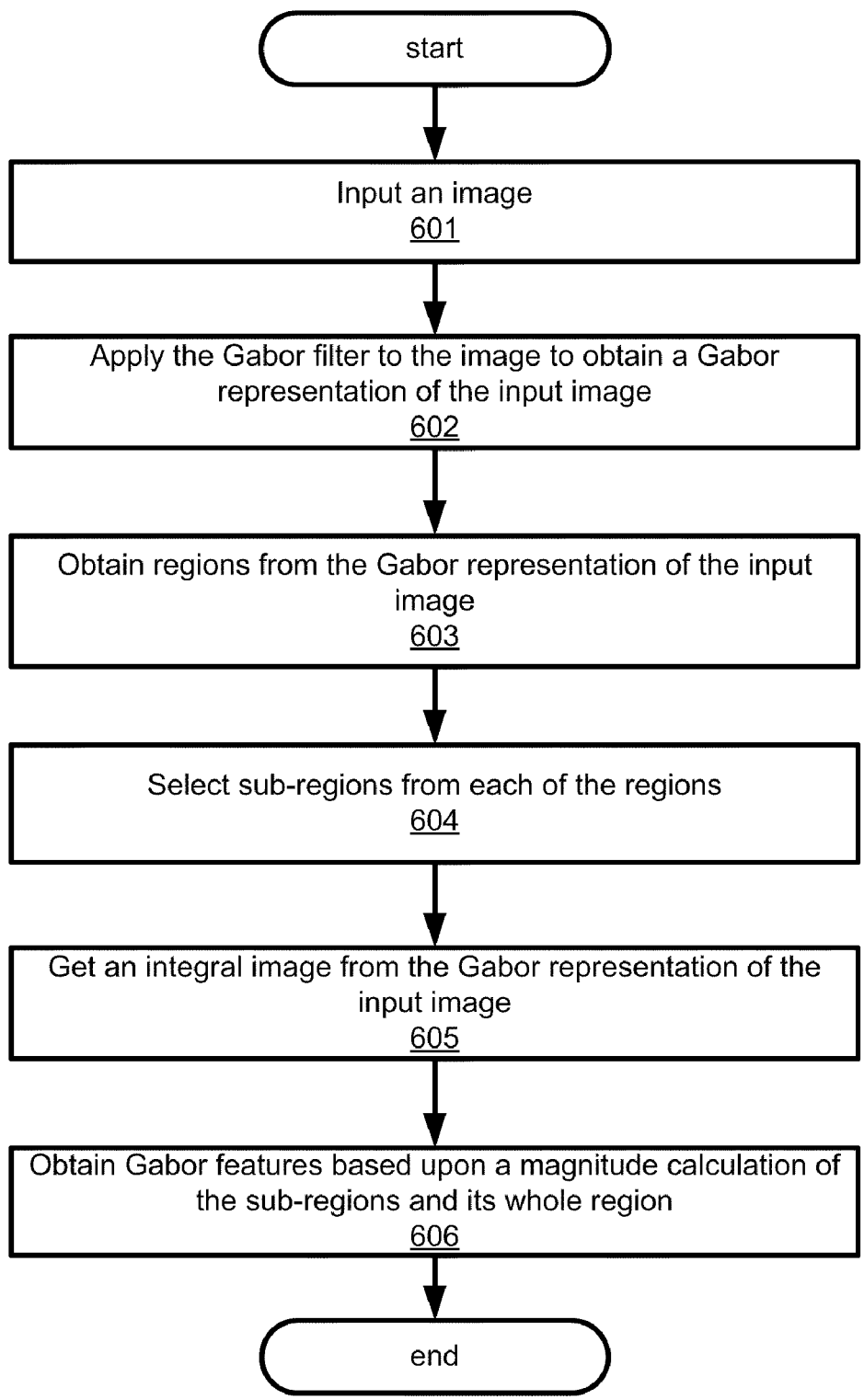
FIG. 6 illustrates an embodiment of a method of obtaining the refined Gabor features.

FIG. 6 illustrates an embodiment of a method of obtaining refined Gabor features. In block 601, an image may be input, for example, from an I/O device. In block 602, the image may go through a Gabor filter and a Gabor representation of the image may be obtained. In block 603, regions may be selected from the Gabor representation of the image based upon various forms, such as wave-front form or local region form. In block 604, sub-regions may be selected from each region of the Gabor representation based upon various patterns, such as the Haar pattern and/or the extended Haar pattern.

In block 605, integral image may be obtained from the Gabor representation of the image. Each integral pixel of the integral image may correspond to each Gabor pixel of the Gabor representation. Value of the integral pixel may represent a magnitude sum for all of the Gabor pixels within a field defined by a Gabor pixel corresponding to the integral pixel. In block 606, the refined Gabor features may be obtained based upon magnitude calculations related to the regions and the sub-regions. The integral image may make the magnitude calculation easier. In an embodiment, the refined Gabor feature may be obtained by dividing a magnitude sum related the sub-region by a magnitude sum related to the region. In another embodiment, the refined Gabor feature may be obtained by calculating magnitude differences as stated above.

Figure 7:
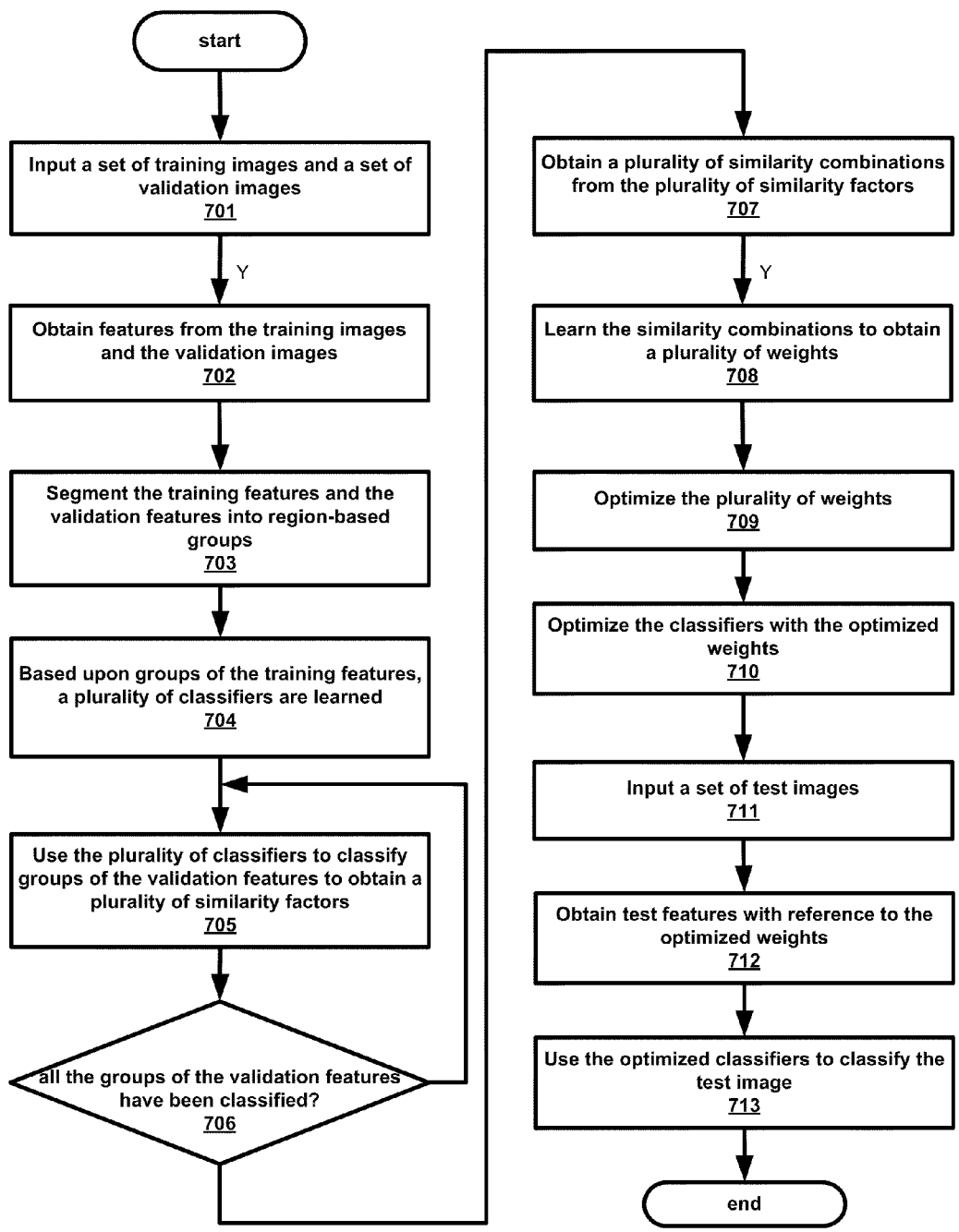
FIG. 7 illustrates an embodiment of a method of obtaining and processing the image features.

FIG. 7 illustrates an embodiment of a method of obtaining and processing image features. In block 701, a set of training images and a set of validation images may be input, for example, from an I/O device. In block 702, training features may be derived from regions of each training image, and validation features may be derived from regions of each validation image, in which regions may be selected from the validation images in a same pattern as the regions selected from the training images. In block 703, training features and validation features may be segmented into region-based groups. Each group of training features may correspond to each region of the training images, and each group of validation features may correspond to each region of the validation images. Moreover, corresponding relationship may be established between groups of training features and groups of validation features. Namely, a group of training features derived from a region of the training images may correspond to a group of validation features derived from the same region of the validation images.

In block 704, a plurality of classifiers may be obtained by training the groups of training features, each classifier corresponding to each group of training features and thus corresponding to each region of training features. In block 705, the plurality of classifiers may be used to classify the groups of validation features, and a plurality of similarity factor may be obtained. Each similarity factor may correspond to each region of validation images and indicate whether the corresponding region of each validation image positively or negatively matches with the corresponding region of a training image having the minimum distance from the validation image.

In block 706, it may be determined whether all of the groups of validation features have been classified. If so, in block 707, a plurality of similarity combinations may be obtained based upon the plurality of similarity factors. Each similarity combination may correspond to each validation image and indicate whether the validation image positively or negatively match with the training image. In block 708, based upon the similarity combinations, a plurality of weights may be obtained. In an embodiment, a discriminant model may be established from which the weights may be learned. Each weight may correspond to each region of the validation images.

In block 709, the plurality of weights may be optimized based upon a certain criteria. In an embodiment, negative weights may be discarded. In block 710, the plurality of classifiers obtained in block 704 may be optimized based upon the optimized weights. In block 711, a test image may be input, and in block 712, groups of test features may be obtained from regions of the test image, each group of test feature from each region of the test image. The regions may be selected from the test image with reference to regions corresponding to the optimized weights. In block 713, the groups of test features may be classified with the optimized classifiers and thus the test image may be recognized.

Figure 8:
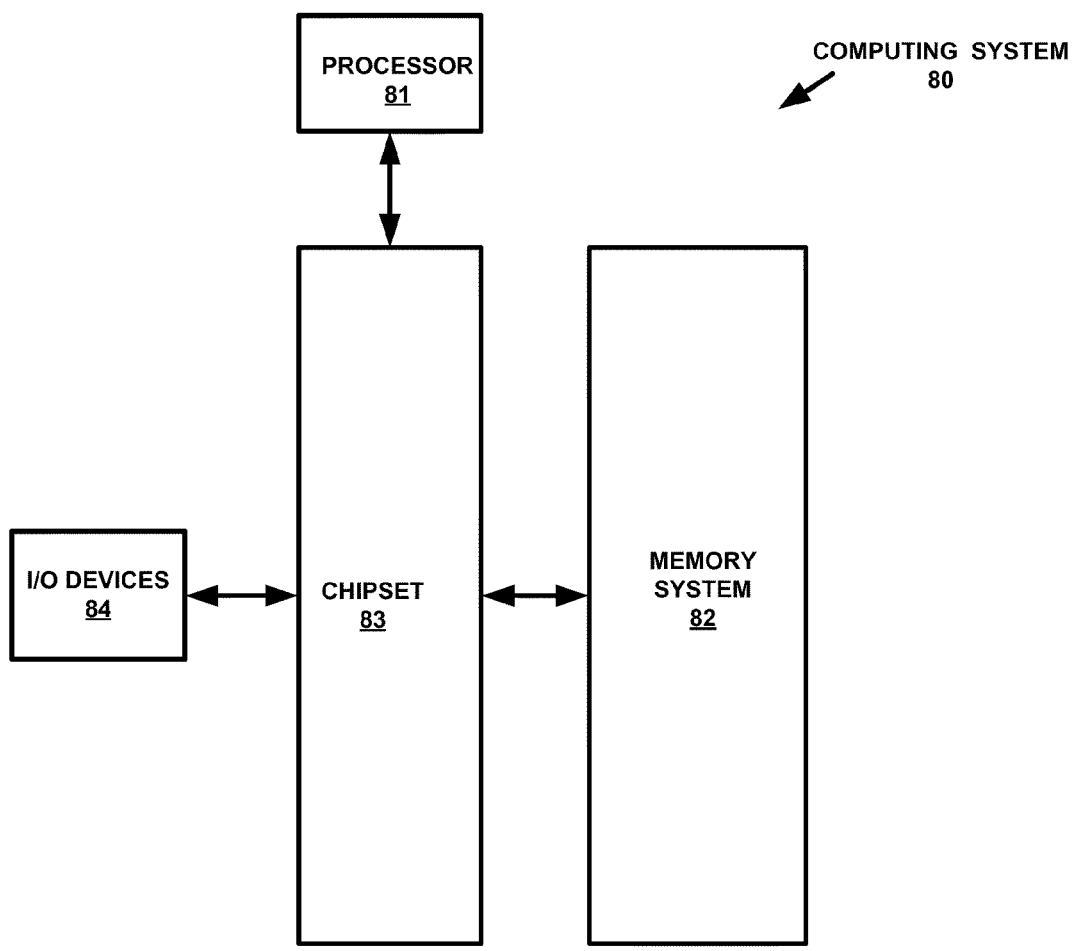
FIG. 8 illustrates an embodiment of a computing platform.

FIG. 8 illustrates an embodiment of a computing platform. Examples of the node may comprise mainframe computers, mini-computers, personal computers, workstations, portable computers, laptop computers, mobile phones or personal data assistants (PDA), or other device capable for data transceiving and processing.

The computing platform may comprise one or more processors 81, memory 82, chipset 83, I/O devices 84 and possibly other components for data transceiving and processing.

Processors 81 are communicatively coupled to various components (e.g., the memory 82) via one or more buses such as a processor bus. Processors 81 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

Memory 82 may store codes to be executed by processor 81. In an embodiment, memory 82 may store codes for obtaining refined Gabor features as stated with reference to FIG. 1. In another embodiment, memory 82 may store codes for obtaining and processing image features as stated with reference to FIG. 5.

Chipset 83 may provide one or more communicative path among processors 81, memory 82, I/O devices 84, and possibly other components. I/O devices 84 may input or output data to or from the targeting node, such as trust levels and weights. Examples for the I/O devices 84 may comprise a network card, a blue-tooth device, an antenna, and possibly other devices for transceiving data.

Although the current invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
   training groups of training features derived from regions of training images to obtain a plurality of classifiers, wherein each classifier corresponds to each group of training features,
   utilizing the plurality of classifiers to classify groups of validation features derived from regions of validation images to obtain a plurality of weights, wherein each weight corresponds to each region of the validation images and indicates how important the each region of the validation images is; and
   discarding a weight from the plurality of weights based upon a certain criterion, wherein the obtaining the plurality of weights further comprises:
   establishing a discriminant function $$\eta(z) = \log\frac{P(t=1|z)}{P(t=0|z)} = \log\frac{P(t=1|z)}{1-P(t=1|z)} = \beta^T z,$$

wherein P represents a probability, t=1 represents a validation image of the validation images positively matches to a training image of the training images, t=0 represents the validation image negatively matches to the training image, z represents how close the each region of the validation image is to the each region of the training image, $\beta^T$ represents the plurality of weights;
   establishing a likelihood function $$L(z) = \sum_{t(z_i)=1} \eta(z_i) - \sum_{t(z_j)=0} \eta(z_j),$$

wherein $$\sum_{t(z_i)=1} \eta(z_i)$$

represents a sum of discriminant functions for one or more of the validation images that positively match to one or more of the training images, and $$\sum_{t(z_j)=0} \eta(z_j)$$

represents a sum of discriminant functions for one or more of the validation images that negatively match to one or more of the training images; and
   obtaining the plurality of weights by maximizing the likelihood function.

2. The method of claim 1, wherein the weight is a negative weight.

3. The method of claim 1, further comprising:
   obtaining the groups of training features from the regions of the training images, wherein the each group of training features corresponds to each region of the training images; and
   obtaining the groups of validation features from the regions of the validation images, wherein each group of validation features corresponds to the each region of the validation images and the each region of the validation images corresponds to the each region of the training images.

4. The method of claim 1, wherein the utilizing the plurality of classifiers further comprises:
   utilizing the plurality of classifiers to classify the groups of validation features to obtain a plurality of similarity factors, wherein each similarity factor corresponds to the each region of the validation images and indicates how close the each region of the validation images is to a corresponding region of the training images; and
   obtaining the plurality of weights based upon the plurality of similarity factors.

5. The method of claim 1, further comprising:
   utilizing a remaining weight from the plurality of weights to optimize the plurality of classifiers, to provide an optimized classifier;
   determining a region from a test image with reference to the remaining weight;
   obtaining a group of test features from the region of the test image; and
   utilizing the optimized classifier to classify the group of test features.

6. A system, comprising:
   a processor;
   a machine-readable medium coupled to the processor, wherein the machine-readable medium further comprises a plurality of instructions which, if executed by the processor, cause the system to perform operations comprising:

training groups of training features derived from regions of training images to obtain a plurality of classifiers, wherein each classifier corresponds to each group of training features, utilizing the plurality of classifiers to classify groups of validation features derived from regions of validation images to obtain a plurality of weights, wherein each weight corresponds to each region of the validation images and indicates how important the each region of the validation images is; and discarding a weight from the plurality of weights based upon a certain criterion, wherein the plurality of instructions that cause the system to obtain the plurality of weights, further causes the system to perform operations comprising:

establishing a discriminant function $$\eta(z) = \log\frac{P(t=1\mid z)}{P(t=0\mid z)} = \log\frac{P(t=1\mid z)}{1-P(t=1\mid z)} = \beta^T z,$$

wherein P represents a probability, t=1 represents a validation image of the validation images positively matches to a training image of the training images, t=0 represents the validation image negatively matches to the training image, z represents how close the each region of the validation image is to the each region of the training image, $\beta^T$ represents the plurality of weights;

establishing a likelihood function $$L(z) = \sum_{t(z_i)=1} \eta(z_i) - \sum_{t(z_j)=0} \eta(z_j),$$

wherein $$\sum_{t(z_i)=1} \eta(z_i)$$

represents a sum of discriminant functions for one or more of the validation images that positively match to one or more of the training images, and $$\sum_{t(z_j)=0} \eta(z_j)$$

represents a sum of discriminant functions for one or more of the validation images that negatively match to one or more of the training images; and obtaining the plurality of weights by maximizing the likelihood function.

7. The system of claim 6, wherein the weight is a negative weight.

8. The system of claim 6, wherein the plurality of instructions further cause the system to perform operations comprising:

obtaining the groups of training features from the regions of the training images, wherein the each group of training features corresponds to each region of the training images; and obtaining the groups of validation features from the regions of the validation images, wherein each group of validation features corresponds to the each region of the validation images and the each region of the validation images corresponds to the each region of the training images.

9. The system of claim 6, wherein the plurality of instructions that cause the system to utilize the plurality of classifiers, further causes the system to perform operations comprising:

utilizing the plurality of classifiers to classify the groups of validation features to obtain a plurality of similarity factors, wherein each similarity factor corresponds to the each region of the validation images and indicates how close the each region of the validation images is to a corresponding region of the training images; and obtaining the plurality of weights based upon the plurality of similarity factors.

10. The system of claim 6, the plurality of instructions further cause the system to perform operations comprising:

utilizing a remaining weight from the plurality of weights to optimize the plurality of classifiers, to provide an optimized classifier;

determining a region from a test image with reference to the remaining weight;

obtaining a group of test features from the region of a test image; and utilizing the optimized classifier to classify the group of test features.

* * * * *